US010482766B2

(12) United States Patent
Mowatt et al.

(10) Patent No.: US 10,482,766 B2
(45) Date of Patent: Nov. 19, 2019

(54) AUTOMATED PARKING LOT SPACE ASSIGNMENT

(71) Applicant: Microsoft Technology Licensing, LLC, Redmond, WA (US)

(72) Inventors: David Mowatt, Dublin (IE); Stephen O'Driscoll, Bray (IE)

(73) Assignee: Microsoft Technology Licensing, LLC, Redmond, WA (US)

( * ) Notice: Subject to any disclaimer, the term of this patent is extended or adjusted under 35 U.S.C. 154(b) by 4 days.

(21) Appl. No.: 15/421,916

(22) Filed: Feb. 1, 2017

(65) Prior Publication Data
US 2018/0218605 A1 Aug. 2, 2018

(51) Int. Cl.
G08G 1/14 (2006.01)
G06Q 30/02 (2012.01)
G08G 1/017 (2006.01)

(52) U.S. Cl.
CPC ......... *G08G 1/144* (2013.01); *G06Q 30/0284* (2013.01); *G08G 1/017* (2013.01); *G08G 1/146* (2013.01)

(58) Field of Classification Search
CPC ...... G08G 1/144; G08G 1/0175; G08G 1/147; G08G 1/143; G08G 1/146; G08G 1/14;
(Continued)

(56) References Cited

U.S. PATENT DOCUMENTS 6,970,101 B1* 11/2005 Squire .................. G08G 1/14
340/309.16
7,181,426 B2* 2/2007 Dutta .................... G06Q 10/02
705/35
(Continued)

FOREIGN PATENT DOCUMENTS

EP 2608184 A1 6/2013
WO 2004084145 A2 9/2004

OTHER PUBLICATIONS

Gomez, et al., "An Intelligent Parking Management System for Urban Areas", In Journal of Sensors (Basel), vol. 16, Issue 6, Jun. 21, 2016, 12 pages.
(Continued)

*Primary Examiner* — Anh V La
(74) *Attorney, Agent, or Firm* — Michael Best & Friedrich LLP (57) ABSTRACT

Methods and systems for assigning a parking space to a vehicle. One system includes a database storing parking space data for a plurality of parking spaces in a parking lot and a server including an electronic processor. The electronic processor receives a request for a parking space assignment for the vehicle, determines a vehicle identifier for the vehicle, and determines at least one selected from a group consisting of a driver preference for a driver of the vehicle and a preference for the parking lot. The electronic processor also generates a plurality of available parking space identifiers from the parking space data, selects, from the plurality of available parking space identifiers, the parking space assignment for the vehicle based on the vehicle identifier and at least one selected from a group consisting of the driver preference and the preference of the parking lot, and transmits the parking space assignment.

18 Claims, 3 Drawing Sheets

(58) Field of Classification Search
CPC ........ G08G 1/017; G08G 1/148; G08G 1/015; G08G 1/123; G06Q 30/0284; G06Q 10/02; G01C 21/36
USPC ........ 340/932.2, 933, 928, 309.16, 942, 525
See application file for complete search history.

(56) References Cited

U.S. PATENT DOCUMENTS

| | | | |
|---|---|---|---|
| 7,783,530 B2* | 8/2010 | Slemmer | G06Q 10/02 340/932.2 |
| 8,791,838 B2 | 7/2014 | Scofield et al. | |
| 9,076,336 B2 | 7/2015 | Tippelhofer et al. | |
| 2005/0096974 A1* | 5/2005 | Chagoly | G08G 1/14 705/13 |
| 2012/0245981 A1 | 9/2012 | Volz | |
| 2014/0019174 A1 | 1/2014 | Bhatt | |
| 2014/0122190 A1 | 5/2014 | Wolfson et al. | |
| 2014/0176348 A1* | 6/2014 | Acker, Jr. | G08G 1/144 340/932.2 |
| 2015/0138001 A1 | 5/2015 | Davies et al. | |
| 2016/0098929 A1* | 4/2016 | Nakhjavani | G08G 1/144 340/932.2 |
| 2016/0180712 A1* | 6/2016 | Rosen | G01C 21/36 705/5 |
| 2016/0189545 A1 | 6/2016 | York et al. | |
| 2016/0189546 A1* | 6/2016 | Kami | G06Q 50/10 340/932.2 |

OTHER PUBLICATIONS

Deshpande, Nilesh, "Parking Management System for Georgia Tech", https://smartech.gatech.edu/bitstream/handle/1853/51948/NileshDeshpande_Parking+Management+System+for+Georgia+Tech.pdf; isessionid=E1AEF5BC04C9ABC391B4D508776BA8E0.smartech?sequence=1, Published on: Apr. 2014, 1-34 pages.

"Head straight to the parking lot with the active parking lot management", http://www.bosch-mobility-solutions.com/en/highlights/connected-mobility/active-parking-lot-management/, Retrieved on: Dec. 9, 2016, 4 pages.

* cited by examiner

AUTOMATED PARKING LOT SPACE ASSIGNMENT

FIELD

Embodiments described herein relate to automatically assigning parking spaces, and, more particularly, to automatically assigning parking spaces in a parking lot.

SUMMARY

Parking spaces, especially in urban areas, are increasingly costly to provide. Furthermore, parking lots, especially larger multi-use lots, are often used inefficiently. Parking spaces are generally unassigned, and taken on a first come, first served basis with no way to dynamically allocate parking spaces based on vehicle or driver preferences. For example, it may be most efficient all drivers working in a particular office to park on a corresponding level of a parking ramp. However, nothing prevents other drivers from parking in the same area, and time is wasted by drivers driving around parking lots for extended periods of time, looking for a desired parking space to open up.

To address this concern, some parking lots reserve individual parking spaces for specific drivers. However, this results in many parking spaces sitting idle when the reservation-holders are not parked in them. Drivers who may benefit from parking temporarily in an unused but reserved parking space are unable to do so, and the parking lot operator loses out on revenues.

Thus, embodiments described herein provide, among other things, systems and methods for automatically assigning parking spaces within a parking lot, and, in particular, assigning the parking spaces based on driver preferences, vehicle characteristics, and parking lot operator preferences. Automated sensors are used to determine unoccupied parking spaces in a parking lot. Unoccupied spaces are narrowed to available spaces based on, for example, the parking lot operator's desire to reserve parking spaces for premium customers and historical parking space usage data. The available spaces may also be ranked using weighted scores based on driver preferences (for example, how close a parking space is to a destination for the driver) and vehicle characteristics (for example, the size of the vehicle compared to the size of the parking space). After ranking the available parking spaces, a parking space assignment for a vehicle is selected based on the rankings, and transmitted to the vehicle (or a mobile communications device carried by an occupant of the vehicle). Thus, a best available parking space is assigned to the driver, who no longer has to waste time driving around the parking lot seeking out the best parking space. As a result, the entire parking lot is used more efficiently.

For example, one embodiment provides a system for automatically assigning a parking space in a parking lot to a vehicle. The system includes a database storing parking space data for a plurality of parking spaces in the parking lot and a server communicatively coupled to the database and including an electronic processor. The electronic processor is configured to receive a request for a parking space assignment for the vehicle, determine a vehicle identifier for the vehicle, and determine at least one selected from a group consisting of a driver preference for a driver of the vehicle and a preference for the parking lot. The electronic processor is also configured to generate, based on input from at least one sensor, a plurality of available parking space identifiers from the parking space data, each available parking space identifier corresponding to an available parking space within the plurality of parking spaces, select, from the plurality of available parking space identifiers, the parking space assignment for the vehicle based on the vehicle identifier and at least one selected from a group consisting of the driver preference and the preference of the parking lot, and transmit the parking space assignment.

Another embodiment provides a method for automatically assigning a parking space in a parking lot to a vehicle. The method includes receiving, with an electronic processor, a request for a parking space assignment for the vehicle, determining, with the electronic processor, a vehicle identifier for the vehicle, and determining, with the electronic processor, at least one selected from a group consisting of a driver preference for a driver of the vehicle and a preference for the parking lot. The method also includes retrieving, from at least one database, parking space data for a plurality of parking spaces in the parking lot, and generating, with the electronic processor, a plurality of unoccupied parking space identifiers, each corresponding to an unoccupied parking space within the plurality of parking spaces, based on input from at least one sensor. In addition, the method includes selecting, with the electronic processor, a plurality of available parking space identifiers from the plurality of unoccupied parking space identifiers, each available parking space identifier corresponding to an available parking space, selecting, from the plurality of available parking space identifiers, the parking space assignment for the vehicle based on the vehicle identifier and at least one selected from a group consisting of the driver preference and the preference of the parking lot, and transmitting the parking space assignment.

A further embodiment provides a non-transitory computer-readable medium including instructions executable by an electronic processor to perform a set of functions. The set of functions includes receiving a request for a parking space assignment for a vehicle from among a plurality of parking spaces included in a parking lot, determining a vehicle identifier for the vehicle, and determining, with the electronic processor, at least one selected from a group consisting of a driver preference for a driver of the vehicle and a preference for the parking lot. The set of functions also includes retrieving, from at least one database, parking space data for the plurality of parking spaces in the parking lot and generating, based on input from at least one sensor, a plurality of unoccupied parking space identifiers, each corresponding to an unoccupied parking space within the plurality of parking spaces, based on input from at least one sensor. In addition, the set of functions includes selecting a plurality of available parking space identifiers from the plurality of unoccupied parking space identifiers, each available parking space identifier corresponding to an available parking space within the plurality of parking spaces, selecting, from the plurality of available parking space identifiers, the parking space assignment for the vehicle based on the vehicle identifier and at least one selected from a group consisting of the driver preference and the preference of the parking lot, and transmitting the parking space assignment.

DETAILED DESCRIPTION

Before any embodiments are explained in detail, it is to be understood that the embodiments described herein are not limited in their application to the details of construction and the arrangement of components set forth in the following description or illustrated in the following drawings. Embodiments may be practiced or carried out in various ways.

Also, it is to be understood that the phraseology and terminology used herein is for the purpose of description and should not be regarded as limiting. The use of "including," "comprising" or "having" and variations thereof herein is meant to encompass the items listed thereafter and equivalents thereof as well as additional items. The terms "connected" and "coupled" are used broadly and encompass both direct and indirect mounting, connecting, and coupling. Further, "connected" and "coupled" are not restricted to physical or mechanical connections or couplings, and may include electrical connections or couplings, whether direct or indirect. Also, electronic communications and notifications may be performed using any known means including direct or indirect wired connections, wireless connections, and combinations thereof. Also functionality described as being performed by one device may be distributed among a plurality of devices.

It should also be noted that a plurality of hardware and software based devices, as well as a plurality of different structural components may be used to implement the embodiments set forth herein. In addition, it should be understood that embodiments may include hardware, software, and electronic components that, for purposes of discussion, may be illustrated and described as if the majority of the components were implemented solely in hardware. However, one of ordinary skill in the art, and based on a reading of this detailed description, would recognize that, in at least one embodiment, the electronic-based aspects of the embodiments may be implemented in software (e.g., stored on non-transitory computer-readable medium) executable by one or more electronic processors.

Figure 1:
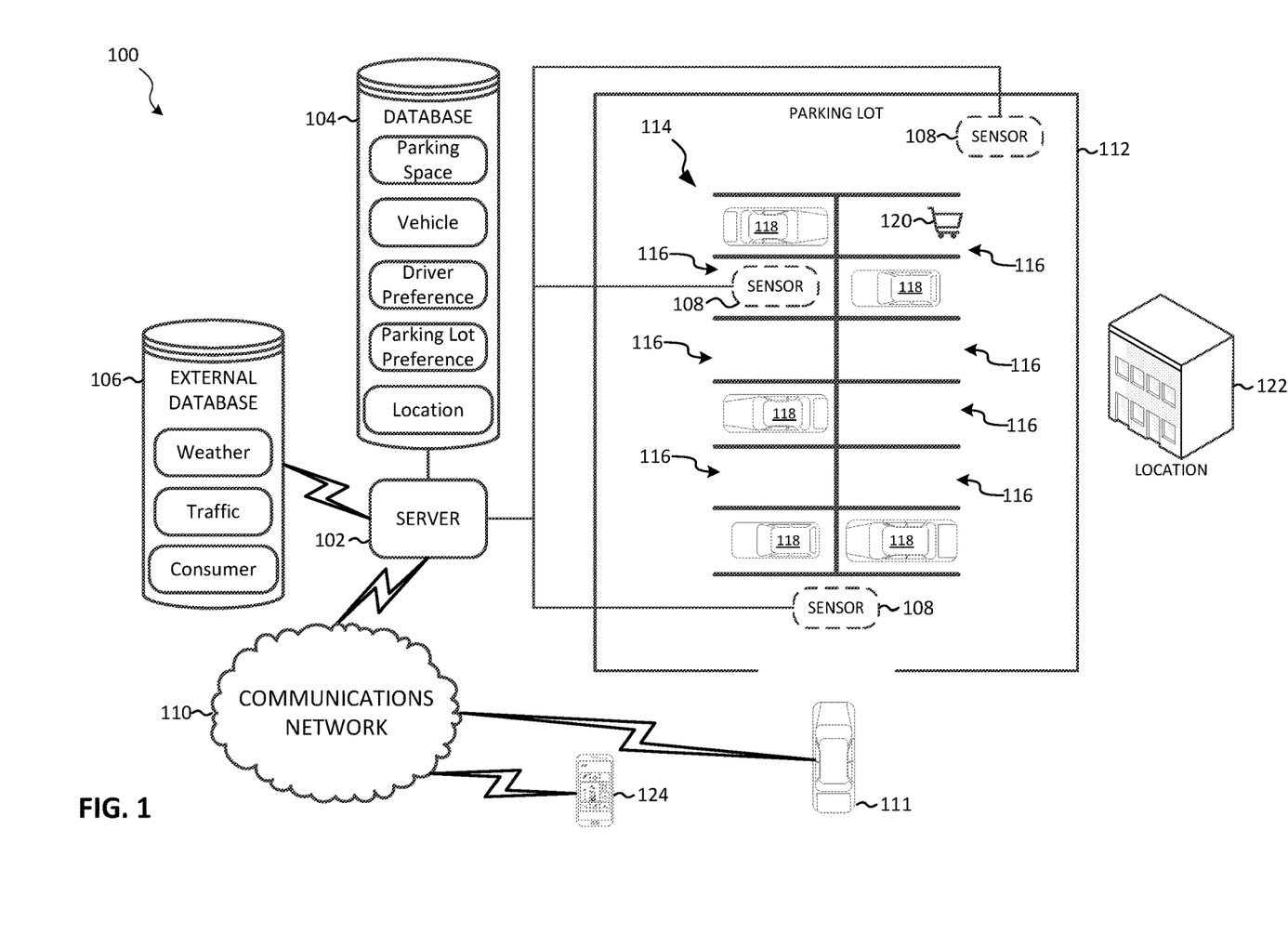
FIG. 1 schematically illustrates a system for automatically assigning a parking space to a vehicle in a parking lot according to some embodiments.

FIG. 1 schematically illustrates a system 100 for automatically assigning a parking space to a vehicle in a parking lot. As illustrated in FIG. 1, the system 100 includes a computer or server 102 and one or more sensors 108. In some embodiments, the system 100 also includes one or more databases, such as one or more local databases 104, one or more external databases 106, or a combination thereof. Each database may be a database housed on a suitable database server communicatively coupled to and accessible by the server 102 and may be a part of a cloud-based database system. Also, it should be understood that, in some embodiments, the server 102 and the databases 104, 106 (or portions thereof) may reside on the same physical machine or in the same data center.

When a local database 104 is included in the system 100, the local database 104 may be located in the same location as the server 102 and may communicate with the server 102 over a wired or wireless connection, which may be a direct connection or an indirect connection over a communications network. When an external database 106 is included in the system 100, the external database 106 may be located remote from the server 102, and the server 102 is communicatively coupled to the external database 106 via a communications network 110. The communications network 110 may be implemented using a wide area network, such as the Internet, a local area network, such as a Bluetooth™ network or Wi-Fi, a Long Term Evolution (LTE) network, a Global System for Mobile Communications (or Groupe Spécial Mobile (GSM)) network, a Code Division Multiple Access (CDMA) network, an Evolution-Data Optimized (EV-DO) network, an Enhanced Data Rates for GSM Evolution (EDGE) network, a 3G network, a 4G network, and combinations or derivatives thereof.

The sensors 108 may also communicate with the server 102 over a wired or wireless connection either as a direct connection or an indirect connection, such as through the communications network 110. It should also be understood that the system 100 is provided as an example and, in some embodiments, the system 100 may include additional components. For example, the system 100 may include multiple servers 102, multiple databases 104, multiple external databases 106, more or fewer sensors 108, or a combination thereof.

As described in more detail below, embodiments of the system 100 automatically determine a parking space assignment for a vehicle 111 within a parking lot 112. The vehicle 111 may be a car, a truck, a van, a motorcycle, or other private or commercial automobile capable of parking in a parking lot 112, and the parking lot 112 may be located near or may directly or indirectly serve a location 122 (described in more detail below) and includes a plurality of parking spaces 114. At any given time, the plurality of parking spaces 114 may be comprised of one or more unoccupied parking spaces 116, one or more occupied spaces (for example, occupied by a parked vehicle 118), or a combination of both. As described in more detail below, an unoccupied parking space 116 may not be available for parking because, for example, the parking space is blocked by an obstacle 120 (in the example illustrated, a shopping cart). It should be understood that the parking lot 112 illustrated in FIG. 1 is presented by way of example and embodiments described herein may be used with different sizes and configurations of parking lots with various numbers of parking spaces. For example, the systems and methods described herein may be used with parking lots of other sizes or configurations, with multi-level parking structures, with parking spaces located across one or more parking lots or on public or private streets treated as one or more collections of parking spaces (for example, virtual parking lots), or combinations thereof. Embodiments described herein may also be implemented partially to automatically assign parking spaces from portions of a parking lot, while other portions are managed conventionally.

As described in more detail below with respect to FIG. 3, the server 102 automatically determines a parking space assignment for the vehicle 111 within the plurality of parking spaces 114. After determining the parking space assignment, the server 102 transmits the parking space assignment (for example, over the communications network 110). In some embodiments, the server 102 transmits the parking space assignment to the vehicle 111. For example, in some embodiments, the vehicle 111 includes components (for example, a microprocessor, a network interface, and a human machine interface, such as an internet-connected infotainment system) that enable the vehicle 111 to receive, process, and output the parking space assignment to an occupant of the vehicle 111. Alternatively or in addition, in some embodiments, the server 102 may transmit the parking space assignment to a mobile communication device 124, such as a smart phone, a tablet computer, a smart watch or other wearable, or the like, carried by an occupant of the vehicle 111. The mobile communication device 124 may be communicatively coupled to the server 102 via the communications network 110 and may be operated by a driver or passenger of the vehicle 111. Also, in some embodiments, the server 102 may transmit the parking space assignment by issuing a ticket or displaying a quick response (QR) or other machine-readable code with an entry gate or kiosk (not shown).

In some embodiments, as illustrated in FIG. 1, the local database 104 and the external database 106 electronically stores or accesses parking space data, vehicle data, driver preference data, parking lot preference data, location data, weather data, traffic data, and consumer data. It should be understood that, in some embodiments, the data stored in the databases 104, 106 may be distributed among multiple databases that communicate with the server 102 and, optionally, each database may store specific data used by the server 102 as described herein. For example, in some embodiments, the local database 104 may be distributed as a parking space database, a vehicle database, a driver preference database, a parking lot preference database, and a location database, or a combination thereof, which may be included in a common database server or separate database servers, included in the server 102, or a combination thereof.

The parking space data may include parking space identifiers (for example, alphanumeric codes) for each of the plurality of parking spaces 114, a location of each of the plurality of parking spaces 114, and other metadata for each parking space. Metadata for a parking space may include the length, width, height, or weight of vehicle that the parking space may accommodate; whether the parking space has an electric vehicle charging station; whether the parking space is covered or exposed; whether the parking space is located in a heated or unheated structure; whether the parking space is reserved for an individual or by a business for use by its employees, customers, or guests; whether a parking space is reserved for handicapped or other special needs parking; and the like. Metadata may also include pricing data for a parking space. For example, one space may be designated as Tier 1 or Tier 2, where Tier 1 is price at $5/hour and Tier 2 is priced at $8/hour. In some embodiments, a pricing tier may represent a premium to be paid that is the same regardless of the length of the stay. For example, a Tier 1 parking space may be priced at $5/hour, whereas a Tier 2 parking space may cost a parker $5/hour plus a $10 premium. Metadata may also include a "time from entrance" score for each parking space, which represents the time it would take a driver to drive from a particular entrance of the parking lot to the parking space. Similarly, the metadata may include a "time to location" score for each parking space, which represents the time it would take an occupant of the vehicle to reach the location 122 from the parking space.

The vehicle data may include a list of unique vehicles, a vehicle identifier corresponding to each of vehicle, and metadata for each vehicle. Metadata for a vehicle may include a vehicle size (for example, the length, width, height, or weight of vehicle); a vehicle power source (for example, whether the vehicle is an electric vehicle); a vehicle charge level (for example, the charge remaining in an electric vehicle's battery system); a special passenger type (for example, disabled, elderly, expectant mother, mother with young children); and the like. Vehicle metadata may also include a list of potential or current occupants of a vehicle (for example, linking a vehicle to a driver included in the driver preference data). The list of current or potential occupants may be updated periodically or on demand (for example, by a computer system of the vehicle or by an occupant of the vehicle using a mobile communication device). The vehicle data may be collected from vehicle owners or operators. For example, a vehicle owner or operator may register their vehicle with the server 102 using a website or a software application (for example, executed by a mobile communication device). The vehicle identifier may be based on governmental data (for example, a license plate number or vehicle identification number (VIN)), may be provided by the owner or operator of the vehicle, or may be assigned by the parking lot operator (for example, automatically when the vehicle is registered).

The driver preference data includes preferences for drivers of vehicles that may request a parking space assignment in the parking lot 112. The preferences may include a duration preference, a destination preference, and a price preference. The duration preference may be a parking time currently desired (for example, 60 minutes) or an average or median parking duration for a driver. The destination preference indicates a driver's destination when they leave the parked vehicle. A driver may have more than one destination preference. For example, a driver may have a weekday destination preference (for example, a business) and a weekend destination preference (for example, a fitness center or shopping destination). A driver may also have one or more destination preferences for each parking lot they use or plan to use. The destination preference may be a current destination for a current trip or may be a persistent or default preference. A destination preference may also indicate a next destination for the driver (for example, after leaving the location 122, the driver may be headed to a home or a workplace). A price preference indicates what prices a driver is willing to pay. For example, a driver may prefer the lowest price or may be willing to pay no more a particular amount. Like the destination preference, the price preference may be set individually for a particular trip or may be a default value. Price preferences may also vary based on the day of the week (for example, weekdays vs. weekends, the time of day, or the season (for example, a driver may be more willing to pay less and walk farther during the summer months).

The parking lot preference data includes data regarding the parking lot as a whole and the parking lot operator preferences. The parking lot preference data may include historical parking lot usage data (for example, data showing that a parking lot usually fills to 80% capacity on Sundays at 4 pm). The data may also include event indicators representing holidays or special events (for example, the days running up to Christmas, cultural events that draw a crowd, and the like). The data may also include an average time-to-park value for a parking lot. The average time-to-park value reflects the average time it takes a vehicle to reach an assigned parking space after receiving a parking assignment. The average time-to-park value may be used as an indicator of how busy a parking lot is. The average time-to-park value for a parking lot may be computed periodically or continuously.

The location data includes data regarding locations, such as location names and location identifiers (for example, alphanumeric codes) for each of one or more locations relevant to a parking lot. A location may be relevant to a parking lot if the location is accessible to occupants of vehicles parking in the parking lot (for example, the location is within a predetermined distance of the parking lot). A location may also be relevant to a parking lot if the location is affiliated with the location. For example, a parking lot may be affiliated with a shopping mall when the parking lot adjacent to the mall and used by employees and customers of the mall. In another example, a corporate business park may provide an affiliated parking lot for the use of employees, customers, and visitors of the businesses in the park. Locations may include stores, businesses, residential properties, theaters, event centers, parks, transit stops, streets, intersections, or other similar landmarks. Locations may also be other parking lots. Locations may be linked or clustered together. For example, a group of retail business locations may be linked to or clustered with their street and one or more nearby intersections. Locations may also be nested. For example, one location (for example, a shopping center) may include more than one other location (for example, retail stores) within it. A location may also be an entrance of another location (for example, the South Entrance of a shopping mall or the East Drive of a business park). Location data may also include metadata for each location (for example, geo-location data for the location, hours of operation for the location, whether the location is a covered entrance to another location, and the like). Location data may be provided by affiliated locations, provided by nearby locations (for example, to provide a service to their employees or customers), may be pulled from an external service (for example, a mapping or geo-location service), or some combination of the foregoing.

The weather data may include current or forecasted weather conditions, which may be accessed from on-site weather monitoring equipment or may be retrieved from public or private databases or services.

The traffic data may include current traffic conditions in the area around the parking lot 112, or for routes commonly used by vehicles driving two and from the parking lot 112. Traffic data may be accessed from public or private databases or services.

The consumer data may include customer data on individual vehicle occupants. For example, a customer value score may be computed for drivers. A customer value score may be determined based on whether a driver is part of a loyalty program, whether the driver a purchased gift cards for any retail locations, whether a driver is known to spend a certain amount in retail locations affiliated with the parking lot, or whether a driver has a self-expressed preference regarding certain locations affiliated with or adjacent to a parking lot. Accordingly, consumer data may be sourced from the driver preference data and from external systems. For example, the consumer data may store information on a driver's recent expenditures in nearby or affiliated business locations. For example, data may be provided from a customer loyalty program. In another example, anonymized credit card data may indicate how much a person with a particular type of credit card spends relative to others. This information may be compared to driver preference data to determine whether a driver has that particular type of credit card. General consumer data (collected from a variety of public and private databases) may also include data for an area surrounding a parking lot (for example, average housing costs, income levels, consumer spending habits, cultural interests, education level, and the like.) Consumer data may also be collected from social media users in an area, including drivers listed in the driver preference data.

As described in more detail below, the server 102 receives sensor inputs (for example, analog or digital signals or data corresponding sensed conditions) from the one or more sensors 108 to determine, among other things, whether parking spaces are occupied or unoccupied. A sensor 108 may be positioned to sense, or view, an individual parking space, multiple parking spaces, a portion of a parking lot (for example, the entrance), or an entire parking lot. For example, a sensor 108 may be an image capture device positioned to capture images (for example, still images, video, or a combination of both), including at least a portion of a parking lot by, for example, sensing light in at least the visible spectrum. The captured images may be processed to detect, for example, the location of parked vehicles 118 and obstacles 120. In some embodiments, an image capture device is positioned to capture images of a vehicle, including portions of an interior of the vehicle, to detect the presence and characteristics of the vehicle and any occupants. Also, in some embodiments, a sensor 80 may be one or more magnetic sensors embedded in the surface (for example, pavement) of a parking space to sense the presence of a parked vehicle in the parking space. In some embodiments, a sensor 108 may also be one or more radar sensors, optical sensors, infrared sensors, or a combination thereof positioned to detect whether vehicles are in or around one or more parking spaces. Some of the sensors 108 may also combine two or more sensor types. For example, a single sensor 108 may incorporate an image capture device and an infrared sensor to capture images when motion is detected in an area.

Figure 2:
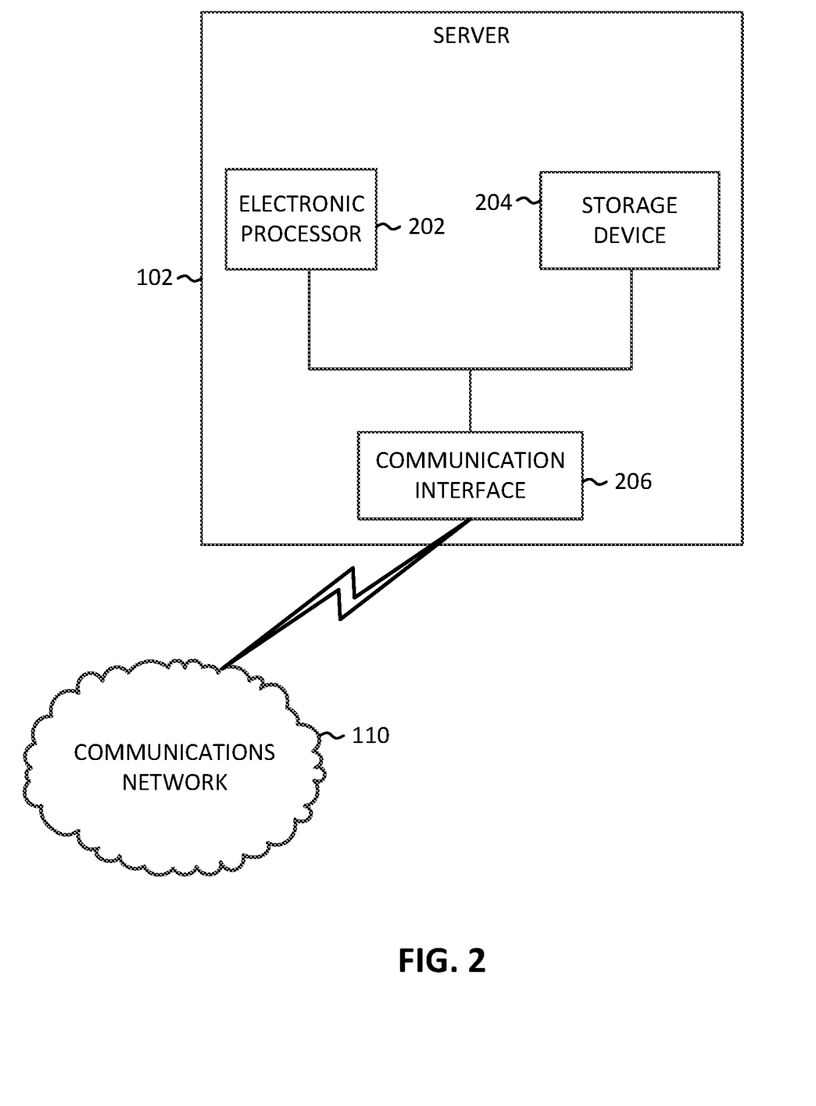
FIG. 2 is a block diagram of a server included in the system of FIG. 1 according to some embodiments.

FIG. 2 schematically illustrates the server 102 in more detail. As illustrated in FIG. 2, the server 102 includes an electronic processor 202 (for example, a microprocessor, application-specific integrated circuit (ASIC), or another suitable electronic device), a storage device 204 (for example, a non-transitory, computer-readable storage medium), and a communication interface 206, such as a transceiver, for communicating over the communications network 110 and, optionally, one or more additional communication networks or connections. It should be understood that the server 102 may include additional components than those illustrated in FIG. 2 in various configurations and may perform additional functionality than the functionality described in the present application. Also, it should be understood that the functionality described herein as being performed by the server 102 may be distributed among multiple devices, such as multiple servers and may be provided through a cloud computing environment, accessible by components off the system 100 via the communications network 110.

The electronic processor 202, the storage device 204, and the communication interface 206 included in the server 102 communicate over one or more communication lines or buses. The electronic processor 202 is configured to retrieve from the storage device 204 and execute, among other things, software related to the control processes and methods described herein. For example, FIG. 3 illustrates a method 300 for automatically assigning a parking space in the parking lot 112 to the vehicle 111, performed by the server 102 according to one embodiment. The method 300 is described as being performed by the server 102 and, in particular, the electronic processor 202. However, it should be understood that in some embodiments, portions of the method 300 may be performed by other devices, including for example, the mobile communication device 124 or a computer in or communicatively coupled to the vehicle 111.

Figure 3:
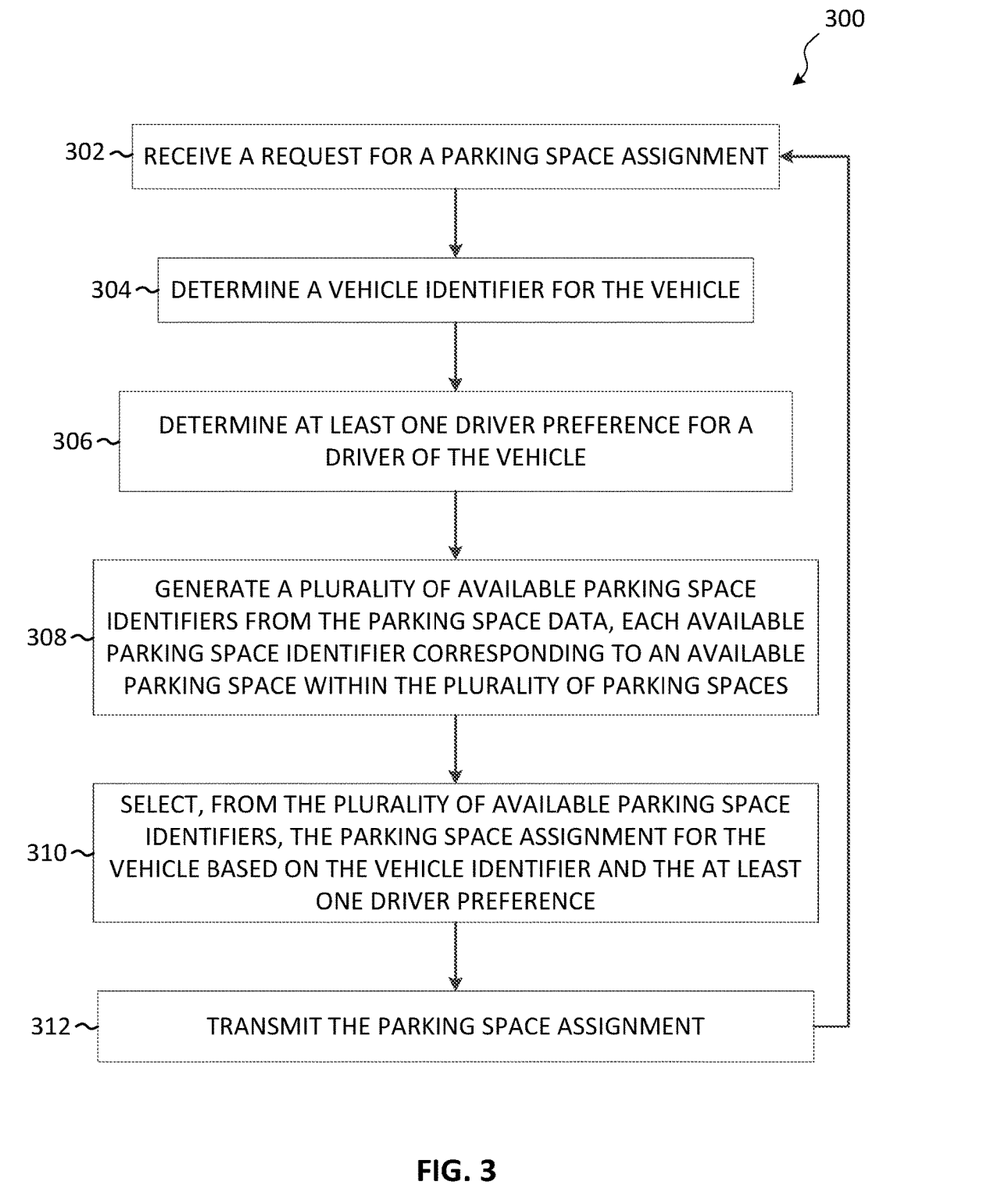
FIG. 3 is a flowchart illustrating a method of automatically assigning a parking space to a vehicle in a parking lot using the system of FIG. 1 according to some embodiments.

As illustrated in FIG. 3, at block 302, the electronic processor 202 receives a request for a parking space assignment for the vehicle 111. For example, a computer of the vehicle 111 may wirelessly transmit, via the communications network 110, a request as the vehicle 111 approaches an entrance to the parking lot 112. In another example, a driver or passenger of the vehicle 111 may send the request via a software application running on the mobile communication device 124. In another example, the request is received when the vehicle 111 pulls up to a gated entrance of the parking lot 112 and sensor 108 senses the presence of the vehicle 111. In another example, the request may be received from a radio-frequency identifier (RFID) device positioned on or in the vehicle 111.

In response to receiving the request, the electronic processor 202 determines a vehicle identifier for the vehicle 111 (at block 304). As described above, the vehicle identifier of the vehicle 111 identifies the vehicle 111 in the database 104. In some embodiments, the vehicle identifier may be received by the electronic processor 202 along with or as part of the request received at block 302. In other embodiments, the electronic processor determines the vehicle identifier by processing images of the vehicle captured by a sensor 108 (for example, by reading a license place or a quick response (QR) or other machine-readable code present on the vehicle 111). In other embodiments, the electronic processor 202 may determine the vehicle identifier by querying the device from which it received the request (at block 302) (for example, as part of an authentication protocol between an application and the server 102).

After identifying the vehicle 111, the electronic processor 202 determines one or more driver preferences for a driver of the vehicle 111 (at block 306). In some embodiments, driver preferences are retrieved from the database 104 using a driver identifier received as part of the request for a parking space assignment. Alternatively, or in addition, the request for a parking space assignment may include driver preferences. As noted above, the driver preferences may be a duration preference, a destination preference, a price preference, a customer value, or a combination thereof. A driver preference may also be a specific request not already stored in one of the databases 104, 106. For example, the driver may indicate, using a human machine interface within the vehicle 111 or an application on the mobile communication device 124, that they wish to find a space near to the location 122, at a lowest cost, at no more than $3 premium over the standard pricing tier, and that they wish to stay for 30 minutes.

From parking space data for the parking lot 112 (for example, retrieved from the database 104), the electronic processor 202 generates a plurality of available parking space identifiers (at block 308). Each available parking space identifier corresponds to an available parking space within the plurality of parking spaces 114. In some embodiments, the electronic processor 202 generates the plurality of available space identifiers by generating a plurality of unoccupied parking space identifiers, wherein each identifier identifies an unoccupied parking space 116 within the plurality of parking spaces 114, and selecting all or a subset of the plurality of unoccupied parking space identifiers as the plurality of available space identifiers. The electronic processor 202 may identify unoccupied parking spaces based on input from one or more sensors 108. For example, the electronic processor 202 may process captured images of the plurality of parking spaces 114 and detect the unoccupied parking spaces 116. In other embodiments, the electronic processor 202 may detect the unoccupied parking spaces 116 using magnetic sensors, optical sensors, infrared sensors, radar sensors, or a combination thereof. The electronic processor 202 may also identify unoccupied spaces based on previous space assignments. For example, by tracking what spaces have already been assigned to vehicles, the electronic processor 202 may be configured to identify what spaces are not occupied.

Alternatively or in addition, in some embodiments, the electronic processor 202 generates the plurality of available parking space identifiers by considering more than just what parking spaces are unoccupied. For example, in some embodiments, after identifying available parking spaces from unoccupied parking spaces, the electronic processor 202 may eliminate some unoccupied spaces based on one or more factors. In particular, in some embodiments, the electronic processor 202 generates the plurality of available parking space identifiers based on one or more vehicle characteristics. The electronic processor 202 may determine the one or more vehicle characteristics based on the request for a parking space assignment, an image of the vehicle 111, the vehicle identifier, or a combination thereof. For example, the electronic processor 202 may determine a size of the vehicle 111 by analyzing captured images of the vehicle 111. In another example, the electronic processor 202 may determine a special passenger type of the vehicle 111 by analyzing captured images of the vehicle's interior (for example, if small children are travelling in the vehicle 111). Also, in some embodiments, the electronic processor 202 retrieves a vehicle size, a vehicle power source, a vehicle charge level, a special passenger type, or other vehicle characteristic from the database 104 based on the vehicle identifier (determined at block 304). Based on the vehicle characteristics, the electronic processor 202 may eliminate some parking spaces that, although occupied, are not suitable for the vehicle 111. For example, the electronic processor 202 may eliminate parking spaces too small to accommodate the size of the vehicle 111. In another example, when the vehicle is an electric vehicle with a low charge level, the electronic processor 202 may eliminate parking spaces without electric vehicle charging stations. Accordingly, the plurality of available parking space identifiers may include identifiers of parking spaces that are both unoccupied parking spaces and accommodate the vehicle 111.

Optionally, in some embodiments, the electronic processor 202 generates the plurality of available parking space identifiers based on one or more preferences of the parking lot 112 (or an operator of the parking lot 112). For example, the electronic processor 202 may generate a normalized availability score for the parking lot 112 and may generate the plurality of available parking space identifiers based on the normalized availability score. In one embodiment, the normalized availability score is a measure (for example, a percentage) of how many of the unoccupied parking spaces should be made available for parking or should be reserved. The normalized availability score may be based on parking lot preference data (for example, retrieved from the database 104). For example, historical parking lot usage data may show that the parking lot usually fills to 80% capacity on Sundays after 4 pm. In such case, the normalized availability score before 4 pm on Sundays may be set to reserve 80% of the parking spaces in the parking lot. For example, if 90% of the parking spaces in the parking lot 112 are unoccupied at 2 pm on a Sunday, the electronic processor 202 may only make available a quantity of the unoccupied parking spaces equivalent to 10% of the total parking spaces, thus reserving 80% of the parking lot for the anticipated 80% use after 4 pm. In another example, the electronic processor 202 may set the normalized availability score based on an event indicator (including for example, the date, time, type, and location of an event) to make a larger number of parking spaces available prior to a heavily-attended sporting taking place at a location near the parking lot. In another example, the normalized availability score may be set based on the busyness of the parking lot, for example, as indicated by the average time-to-park value for the parking lot. When the parking lot is busier, the normalized availability score may be biased toward reserving more spaces for future parkers (for example, who may be willing to pay more), and when the parking lot is less busy, the normalized availability score may be biased toward allowing more new parkers. In some embodiments, the normalized availability score is set based on a combination of the foregoing. Also, in some embodiments, some factors are weighted more heavily in determining the normalized availability score. For example, historical usage data or a current measure of busyness may be weighted more heavily than anticipated level of usage based on a scheduled event. In some embodiments, weather conditions may be taken into account in determining the normalized availability score. For example, a rainy weather forecast may lower the impact of a predicted usage from an outdoor event in the summer months.

The preferences of the parking lot 112 may also include an allocation generosity score. For example, the electronic processor 202 may generate an allocation generosity score for the parking lot 112 and generate the plurality of available parking space identifiers based on the allocation generosity score. In some embodiments, the allocation generosity score is a measure (for example, a percentage) indicating the degree to which the operator of the parking lot 112 desires to give away what might be considered 'good' parking spaces to the current parker (that is, the driver of the vehicle 111) versus retaining the parking spaces for other future customers. In some embodiments, the allocation generosity score is set based on one or more parking lot operator preferences. For example, a parking lot operator may prefer to retain spaces for premium customers. In some embodiments, the allocation generosity score is set or modified based on a weather condition. For example, if it is raining or snowing, the allocation generosity score may be set to allow customers to park in parking spaces which are nearer a desired location but would normally be reserved for premium customers. In some embodiments, the allocation generosity score may be set based on one or more driver preferences. For example, a driver with a high customer value or who participates in a customer loyalty program may have premium spaces made available to them. In some embodiments, the allocation generosity score is set based on a combination of the foregoing. In some embodiments, some factors are weighted more heavily in determining the allocation generosity score. For example, certain customer preferences (for example, for high value customers) may be weighted more heavily than the operator's desire to reserve a number of spaces.

As described in detail below, the electronic processor 202 may select a parking space assignment based on one or more scores assigned to the available parking spaces. In some embodiments, the electronic processor 202 may use preferences of the parking lot 112, such as the normalized availability score, the allocation generosity score, or both, to apply a weighting to the one or more scores assigned to the available parking spaces. As noted above, in some embodiments, the electronic processor 202 generates the plurality of available space identifiers by selecting all of the plurality of unoccupied parking space identifiers (that is, the plurality of available parking spaces is the plurality of unoccupied parking spaces). In such embodiments, although the electronic processor 202 may not use the normalized availability score and the allocation generosity score to select the available parking spaces, the electronic processor 202 may still use either one or both to apply a weighting to the one or more scores assigned to the available parking spaces.

Regardless of how the electronic processor 202 generates the plurality of available parking space identifiers, the electronic processor 202 selects the parking space assignment for the vehicle 111 based on the plurality of available parking space identifiers (at block 310). To select a parking space assignment, the electronic processor 202 may assign one or more scores to each of the plurality of available parking space identifiers. For example, the electronic processor 202 may assign each of the plurality of available parking space identifiers a proximity score, a time-to-park score, a needs score, an allocation desirability score, a specialized space score, a price score, or a combination thereof. It should be understood that that the electronic processor 202 may use one or more of the scores to rank the available parking spaces, and, in some embodiments, the electronic processor 202 does not generate all of the different types of parking space scores described above.

In some embodiments, a proximity score represents a time to a desired location (for example, as expressed in the driver preferences). When multiple desired locations are specified by the driver (for example, an office building and a coffee shop), the proximity score represents the average distance to all specified locations. If no location preference is stated, the time to the center of a primary or default location (for example, the location 122) served by the parking lot 112 may be used for the proximity score. The proximity score may be further increased or decreased via a weighting (for example, derived from whether a driver preference indicates that proximity is more or less important than price or time to park). A high score may indicate that the parking slot is close to the driver's desired location. In some embodiments, the proximity score may represent or also be based on the time to one of multiple exits of the parking lot 112. For example, one exit may provide better access than another exit to a preferred route to the driver's next destination (for example, as indicated by a destination preference received from the driver). In some embodiments, a traffic condition may be used to assign a weight to a proximity score based on the time to an exit. For example, when a traffic condition indicates that a preferred route has a longer projected drive time than a second route (for example, which is ordinarily not preferred), the proximity score for the exit nearest the lesser preferred route may be increased.

In some embodiments, a time-to-park score is based on a time required to drive the vehicle 111 from the entrance of the parking lot 112 to the parking space being scored. A time-to-park score may also be weighted based on driver preferences.

In some embodiments, a needs score represents the degree of fit between the driver's specialized needs (for example, disability, expectant mother, small children), the vehicle's needs (for example, the size and whether the vehicle is electric and requires charging), and the attributes of the parking space being scored (for example, whether the vehicle will fit, how close the parking space is to an entrance location, whether the parking space has a charging station). A high needs score may indicate that needs are met well. The weighting of this score may also be influenced by driver preferences (for example, the degree to which a young parent could cope with transporting small children to a distant parking space may vary).

In some embodiments, an allocation desirability score is a measure of how "desirable" a parking space is. An allocation desirability score may be based on, for example, price tiers and relative distances to locations. An allocation desirability score may be an inverse score where spaces the parking operator would most want to keep for future customers would score low and undesirable spaces score high. An allocation desirability score may be weighted according to an overall allocation score. For example, even if a parking space is highly desirable, if the parking lot will likely remain empty and it is also raining, then the normalized allocation desirability score will be high even for the best spaces. In some embodiments, proximity scores based on exits of the parking lot 112, weighted for current or predicted traffic conditions, may be used to weight the allocation desirability score. For example, heavy traffic on a road adjacent to an exit may increase wait times for drivers exiting the parking lot 112 via that exit, making parking spaces near that exit less desirable.

In some embodiments, a specialized space score is computed for specialized spaces (for example, electric car charging points, or handicap parking spaces with extra access for doors). The specialized space score may be weighted substantially compared to the other parking space scores, so that it is very rare for spaces with such high scores to be assigned to drivers without those specialized needs, except when general availability is predicted to be low or they are the only parking spaces available.

In some embodiments, a price score is an inverse variable based on the price for the parking space. For example, the further the parking space's price point is below the user's desired price point, the higher the price score.

By comparing the one or more scores generated for each of the plurality of available parking space identifiers, the electronic processor 202 may select the parking space assignment. For example, the electronic processor 202 may rank the available parking spaces based on the assigned score or scores and select the highest ranked parking space for the park space assignment. When multiple scores are generated for a parking space, the electronic processor 202 may compare scores individually or may sum, average, or otherwise process multiple scores to generate a composite score. Also, in some embodiments, one or more scores may be weighted to achieve different levels of optimization for each variable. For example, in some embodiments, the electronic processor 202 may use preferences of the parking lot 112, such as the normalized availability score, the allocation generosity score, or both, to apply a weighting to the one or more scores assigned to the available parking spaces. Accordingly, the electronic processor 202 may use preferences of the parking lot 112 to filter the unoccupied parking spaces and initially select the plurality of available parking spaces and, in addition or alternatively, may use preferences of the parking lot 112 to score or rank individual parking spaces. For example, in some embodiments, the electronic processor 202 may not use the normalized availability score or the allocation generosity score to initially select the available parking spaces but may use either one or both to apply a weighting to the one or more scores assigned to the available parking spaces.

In some embodiments, a type of score may be more influenced by weights than other scores. For example, the weighting of the allocation desirability score may be more influenced, relative to the other scores, by either or both of the normalized availability score and the allocation generosity score. Also, in some embodiments, the driver's duration preference may influence the allocation desirability score. For example, a parking lot operator may wish to assign drivers staying for a shorter duration (for example, 15 minutes) a more convenient parking space, because the driver will vacate that parking space for future drivers in the near future.

Regardless of how the electronic processor 202 determines the parking space assignment, the electronic processor 202 transmits the parking space assignment (at block 312). As noted above, the parking space may be transmitted directly to a system of the vehicle 111, to a mobile communication device 124 operated by a driver or passenger of the vehicle 111, or by issuing a ticket or displaying a quick response (QR) or other machine-readable code at an entry gate or kiosk. In some embodiments, further information (for example, the predicted time to park, level number, distance from location, and directions to the parking space) is also generated and transmitted with the parking space assignment.

In some embodiments, one or more sensors 108 may detect whether a parked vehicle matches the vehicle assigned to a parking space (for example, based on a license plate or other characteristics of the parked vehicle). If the parked vehicle does not match the assigned vehicle, a notification may be generated (for example, flashing lights, text message notification, or the like) to alert the driver or an operator of the parking lot that the parked vehicle is not in its assigned space.

Optionally, in some embodiments, the electronic processor 202 selects two or more potential parking space assignments for the vehicle 111. As noted above, the electronic processor 202 may rank each of the available parking spaces by generating a parking space score. Accordingly, in some embodiments, the electronic processor 202 may generate a first potential parking space assignment and a second potential parking space assignment by selecting a highly-ranked parking space for each of two price points based on the price scores. For example, the electronic processor 202 may select the two highest ranked available parking spaces having the highest and second highest price scores. In such embodiments, the electronic processor 202 may transmit the first and second potential parking space assignments. The driver may then choose one of the parking space assignments (for example, by parking in the assigned space or by selecting one using an application on the vehicle 111 of the mobile communication device 124).

As noted above, the system and methods described herein may be used in conjunction with multi-level parking structures. In such situations, it may be more efficient to direct the vehicle 111 to a waiting area on an assigned or desired level, rather than have the vehicle 111 wait at an entrance or on a different level. Accordingly, in some embodiments, the electronic processor 202 determines and transmits a waiting area assignment for the vehicle 111 based on the vehicle identifier one or more driver preferences similar to how the electronic processor 202 determines and transmits a parking space assignment. For example, the waiting area assignment may be for a waiting area on the second level of a parking structure, which level is closer to the desired location of the driver, and has spaces that can accommodate the size of the vehicle 111. When the electronic processor 202 receives an indicator that the vehicle is located in the assigned waiting area (for example, as sensed by a sensor 108), the electronic processor 202 may generate a parking space assignment for the vehicle as described above. In addition, the electronic processor 202 may base the parking space assignment on the vehicle's waiting area assignment. For example, the electronic processor 202 may select the plurality of available space identifiers from spaces on the same level as the waiting area assignment. Waiting area assignments may also be used in large single level parking lots, for example, to more efficiently route and/or distribute vehicles within the parking lot.

It should be noted that embodiments have been described herein with respect to driven vehicles. This should not be considered limiting. Embodiments of the systems and methods provided are applicable to partially and fully autonomous or self-driving vehicles. For example, an autonomous vehicle control system may request a parking space assignment, receive the assignment as described above, and automatically proceed to the assigned parking space. In another example, the electronic processor 202 may assign a low weight to a location preference for occupants of a self-driving vehicle 111, because the self-driving vehicle 111 is capable of offloading passengers at a location 122, and proceeding automatically to an assigned parking space.

Thus, embodiments provide, among other things, systems and methods for automatically assigning a parking space in a parking lot to a vehicle. Various features and advantages of some embodiments are set forth in the following claims.

What is claimed is:

1. A system for automatically assigning a parking space to a vehicle in a parking lot, the system comprising:
    a database storing parking space data for a plurality of parking spaces in the parking lot; and
    a server communicatively coupled to the database and including an electronic processor configured to
    receive a request for a parking space assignment for the vehicle;
    determine a unique vehicle identifier for the vehicle;
    determine a driver preference for a driver of the vehicle;
    generate a preference of an operator of the parking lot by generating a normalized availability score for the parking lot based on at least one selected from a group consisting of historical parking lot usage data, an event indicator, and an average time-to-park value;
    generate, based on input from at least one sensor, a plurality of available parking space identifiers from the parking space data, each available parking space identifier corresponding to an available parking space within the plurality of parking spaces;
    select, from the plurality of available parking space identifiers, the parking space assignment for the vehicle based on the unique vehicle identifier, the driver preference, and the preference of the operator; and
    transmit the parking space assignment.

2. The system of claim 1, wherein the driver preference is at least one selected from a group consisting of a duration preference, a destination preference, a price preference, and a customer value.

3. The system of claim 1, further comprising
    the at least one sensor selected from a group consisting of an image capture device, a magnetic sensor, an optical sensor, an infrared sensor, and a radar sensor, and
    wherein the electronic processor is further configured to generate, based on input from the at least one sensor, a plurality of unoccupied parking space identifiers, each of the plurality of unoccupied parking space identifiers corresponding to an unoccupied parking space within the plurality of parking spaces, and
    wherein the electronic processor is configured to generate the plurality of available parking space identifiers by selecting a subset of the plurality of unoccupied parking space identifiers.

4. The system of claim 1, wherein the electronic processor is further configured to determine at least one vehicle characteristic based on at least one of an image of the vehicle, and wherein the electronic processor is configured to generate the plurality of available parking space identifiers based on the at least one vehicle characteristic.

5. The system of claim 4, wherein the at least one vehicle characteristic is at least one selected from a group consisting of a vehicle size, a vehicle power source, a vehicle charge level, and a special passenger type.

6. The system of claim 1, wherein the electronic processor is configured to generate the preference of the operator by generating an allocation generosity score for the parking lot based on at least one selected from a group consisting of at least one operator preference, the at least one driver preference, and a weather condition.

7. The system of claim 1, wherein the electronic processor is further configured to, for each of the plurality of available parking space identifiers, determine a parking space score based on at least one of a group consisting of a proximity score, a time-to-park score, a needs score, an allocation desirability score, a specialized space score, and a price score and wherein the electronic processor is configured to select the parking space assignment by comparing the parking space score for each of the plurality of available parking space identifiers.

8. The system of claim 1, wherein the electronic processor is configured to select the parking space assignment by selecting, from the plurality of available parking space identifiers, a first potential parking space assignment for the vehicle and selecting, from the plurality of available parking space identifiers, a second potential parking space assignment for the vehicle, and wherein the electronic processor is configured to transmit the parking space assignment by transmitting the first potential parking space assignment and the second potential parking space assignment.

9. The system of claim 1, wherein the electronic processor is further configured to
    determine a waiting area assignment for the vehicle based on the unique vehicle identifier and the at least one driver preference,
    transmit the waiting area assignment, and
    receive an indicator that the vehicle is located in a waiting area corresponding to the waiting area assignment,
    wherein the electronic processor is configured to select the parking space assignment in response to receiving the indicator that the vehicle is located in the waiting area, based on the unique vehicle identifier, the at least one driver preference, and the waiting area assignment.

10. A method for automatically assigning a parking space in a parking lot to a vehicle, the method comprising:
    receiving, with an electronic processor, a request for a parking space assignment for the vehicle;
    determining, with the electronic processor, a unique vehicle identifier for the vehicle;
    determining, with the electronic processor, a driver preference for a driver of the vehicle;
    generating a preference of an operator of the parking lot by generating a normalized availability score for the parking lot based on at least one selected from a group consisting of historical parking lot usage data, an event indicator, and an average time-to-park value;
    retrieving, from at least one database, parking space data for a plurality of parking spaces in the parking lot;
    generating, with the electronic processor, a plurality of unoccupied parking space identifiers, each corresponding to an unoccupied parking space within the plurality of parking spaces, based on input from at least one sensor;
    selecting, with the electronic processor, a plurality of available parking space identifiers from the plurality of unoccupied parking space identifiers, each available parking space identifier corresponding to an available parking space;

selecting, from the plurality of available parking space identifiers, the parking space assignment for the vehicle based on the unique vehicle identifier, the driver preference, and the preference of the operator; and transmitting the parking space assignment.

11. The method of claim 10, wherein transmitting the parking space assignment includes transmitting the parking space assignment to the vehicle.

12. The method of claim 10, wherein transmitting the parking space assignment includes transmitting the parking space assignment to a mobile communication device carried by an occupant of the vehicle.

13. The method of claim 10, wherein determining the at least one driver preference includes determining the at least one driver preference based on the request.

14. The method of claim 10, wherein determining the unique vehicle identifier for the vehicle includes determining the unique vehicle identifier for the vehicle based on input from the at least one sensor.

15. The method of claim 10, further comprising determining at least one vehicle characteristic based on at least one of an image of the vehicle, and wherein generating the plurality of available parking space identifiers includes generating the plurality of available parking space identifiers based on the at least one vehicle characteristic.

16. The method of claim 10, further comprising generating the preference of the operator by generating an allocation generosity score for the parking lot based on at least one selected from a group consisting of at least one operator preference, the at least one driver preference, and a weather condition.

17. The method of claim 10, further comprising, for each of the plurality of available parking space identifiers, determining a score and wherein selecting the parking space assignment includes selecting the parking space assignment by comparing the score for each of the plurality of available parking space identifiers.

18. Non-transitory computer-readable medium including instructions executable by an electronic processor to perform a set of functions, the set of functions comprising:

receiving a request for a parking space assignment for a vehicle from among a plurality of parking spaces included in a parking lot;

determining a unique vehicle identifier for the vehicle;

determining, with the electronic processor, a driver preference for a driver of the vehicle;

generating a preference of an operator of the parking lot by generating a normalized availability score for the parking lot based on at least one selected from a group consisting of historical parking lot usage data, an event indicator, and an average time-to-park value;

retrieving, from at least one database, parking space data for the plurality of parking spaces in the parking lot;

generating, based on input from at least one sensor, a plurality of unoccupied parking space identifiers, each corresponding to an unoccupied parking space within the plurality of parking spaces, based on input from at least one sensor;

selecting a plurality of available parking space identifiers from the plurality of unoccupied parking space identifiers, each available parking space identifier corresponding to an available parking space within the plurality of parking spaces;

selecting, from the plurality of available parking space identifiers, the parking space assignment for the vehicle based on the unique vehicle identifier, the driver preference, and the preference of the operator; and transmitting the parking space assignment.

* * * * *